United States Patent

Koduri et al.

[11] Patent Number: 6,042,247
[45] Date of Patent: Mar. 28, 2000

[54] EFFICIENT HYBRID ILLUMINATOR

[75] Inventors: Sreenivasan K. Koduri, Dallas; Joe D. Woodall, Euless; Lance C. Wright, Richardson; Charles K. Harris, Dallas, all of Tex.

[73] Assignee: Texas Instruments Incorporated, Dallas, Tex.

[21] Appl. No.: 09/111,642

[22] Filed: Jul. 8, 1998

Related U.S. Application Data

[60] Provisional application No. 60/052,189, Jul. 11, 1997.

[51] Int. Cl.$^7$ ....................................................... F21V 5/00
[52] U.S. Cl. ........................................... 362/245; 362/246
[58] Field of Search ..................................... 362/227, 240, 362/242, 243, 244, 245, 246, 299

[56] References Cited

U.S. PATENT DOCUMENTS

| | | | |
|---|---|---|---|
| 4,677,533 | 6/1987 | McDermott et al. | 362/240 |
| 5,897,195 | 3/1999 | Choate | 362/33 |

*Primary Examiner*—Cassandra Spyrou
*Assistant Examiner*—Jared Treas
*Attorney, Agent, or Firm*—Wade James Brady, III; Frederick J. Telecky, Jr.

[57] ABSTRACT

An illumination system for wire bonding at wire bonding locations which includes an illuminator having a highly light transmissive portion with an end surface and an axial bore extending therethrough and terminating at the end surface. The illuminator includes a first light source for directing light substantially axially through the bore to the end surface and a second light source for directing light substantially axially through the highly light transmissive portion to the end surface. The end surface is preferably a light diffusing surface. The bore is preferably tapered with the taper widening in a direction toward the end surface. The surface of the bore is preferably a light diffusing surface. The bore can alternately include a layer of highly light reflecting material disposed on its surface. The highly light transmissive portion has an outer surface which can include a layer of highly light reflecting material disposed thereon. The system further includes a mirror spaced from the bore in a direction opposed to the end surface and coaxial with the bore for reflecting light passing through the bore and circuitry to digitally store a representation of the reflected light.

20 Claims, 1 Drawing Sheet

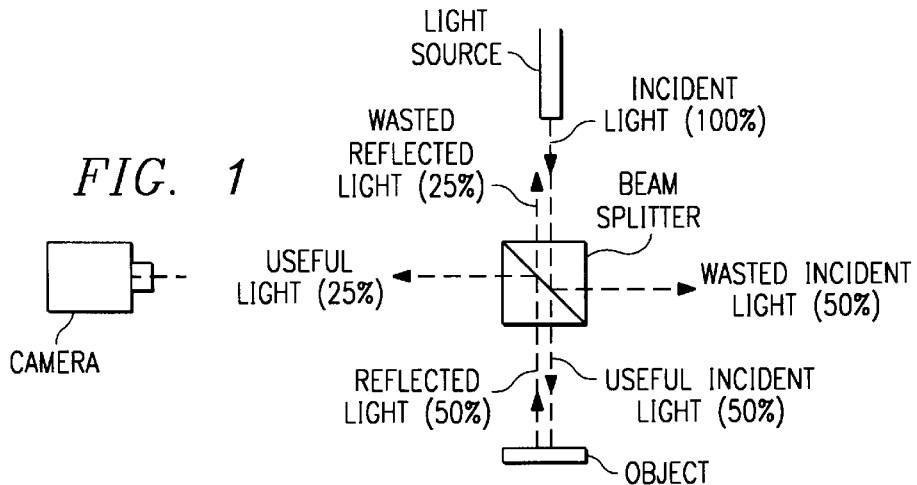
FIG. 1
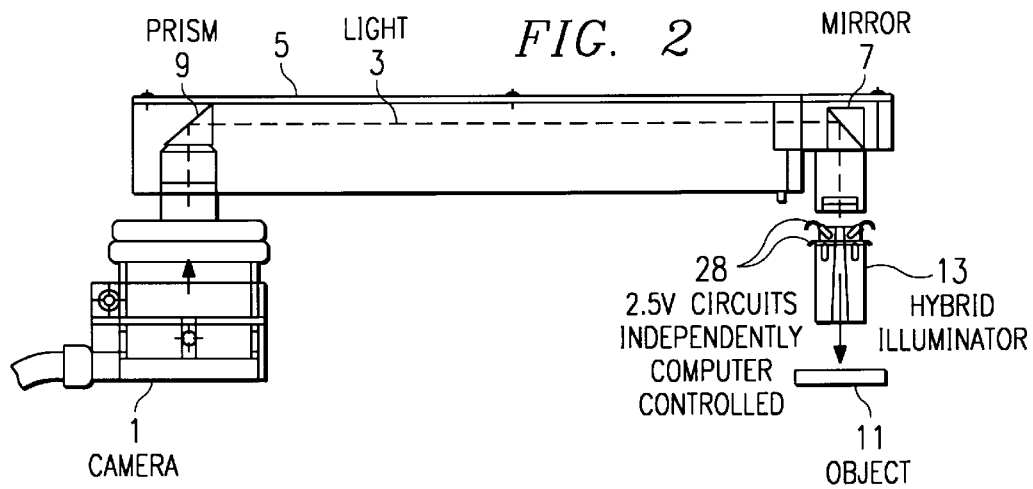
FIG. 2
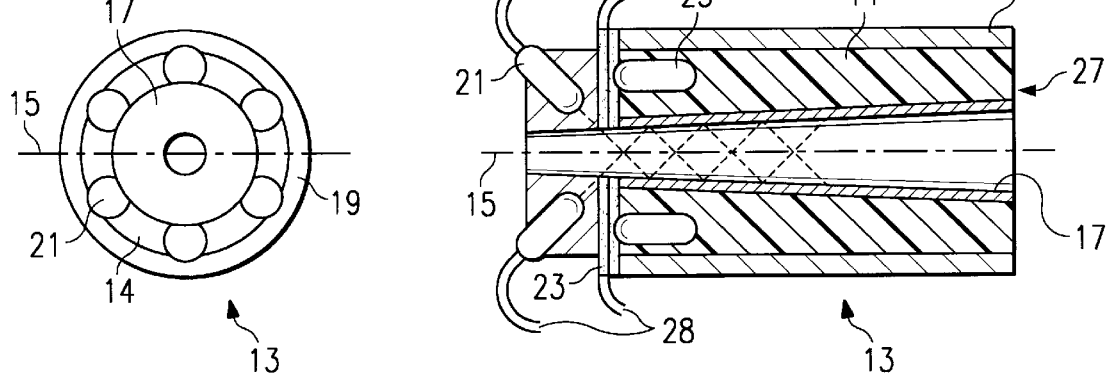
FIG. 3a
FIG. 3b

EFFICIENT HYBRID ILLUMINATOR

CROSS REFERENCE TO PRIOR APPLICATIONS

This application claims priority under 35 U.S.C. 119 based upon Provisional Application Ser. No. 60/052,189, filed Jul. 11, 1997.

BACKGROUND OF THE INVENTION

1. Field of the Invention

This invention relates to an illuminator for use primarily in conjunction with semiconductor fabrication equipment and, more specifically, to a hybrid illuminator for use in bonding operations in conjunction with semiconductor fabrication.

2. Brief Description of the Prior Art

In the fabrication of semiconductor devices, one of the operations required involves the bonding of wires between two bonding locations, generally between bond pads on the semiconductor device and lead fingers of a lead frame. This bonding operation requires the use of a wire bonder. A wire bonder uses fine gold wire to couple, for example but not limited to, the bond pads on the semiconductor chip to the individual leads or pins to which connection is to be made, such as, but not limited to, the lead fingers of the lead frame. With the continued miniaturization of the geometry of semiconductor devices as well as the components within and on the semiconductor devices, it has become increasingly difficult to accurately locate the bond pads and leads or pins to which bonds must be made. Bond pads are now approaching dimensions of 5 mils or 25 microns. It is necessary that the bonder know precisely where the connections are to be made on a chip by chip basis because the bond locations can differ from chip to chip, even on essentially identical chips. Even minute dimensional differences can result in failures (reduced yield) or diminished electrical properties of the final device.

To mitigate this problem, a machine-vision system was developed to locate the exact positions where these connections or bonds are to be made. The vision system automatically magnifies, displays, measures and locates different parts of the device at which bonds are to be made. This vision system includes mainly electronics, software, camera, optics and illumination units. Since ambient light is generally insufficient to properly illuminate the chip and lead frame components to which the bond is to be made, illumination units are required to provide the required light to make the device to which a bond is to be made sufficiently visible while the camera takes pictures through the optics. These pictures are digitally stored in the electronics hardware and are digitally processed by the software in well known manner which forms no part of this invention.

To view different parts of the object, different types of lighting are required. In general, an axial light is used to view the die surface because the die surface is generally very smooth and reflects incident light without scattering. Accordingly, incident light directed parallel to an optical axis normal to the surface of the die is reflected back almost entirely parallel to the optical axis. An off axis light is used to view the lead frame which has a generally rough surface and scatters light impinging thereon. The light on the lead frame must be applied evenly to avoid dark spots in the picture, the dark spots (e.g. shadows) introducing features in the pictures which are not actually a part of the structure being viewed and are therefore undesirable. Accordingly, for viewing of the lead frame, incident light comes from around the object and is diffused so that it scatters in all directions and at all angles. The amount of scattering depends upon the surface roughness at the edge of the light conductor from which the light exits the light conductor.

The axial light travels through a beam splitter to make the incident light follow the optical axis. However, a side effect of using the beam splitter is the reduction of optical efficiency of the system. As can be seen with reference to FIG. 1, half of the incident light from the light source to the beam splitter passes through the beam splitter and half is reflected therefrom and is wasted. In addition, half of the reflected light from the object is reflected by the beam splitter and half of that reflected light passes through the beam splitter and is wasted. The result is that, at most, only twenty-five percent of the original light from the axial light source is reflected to the camera. With such a large amount of light being lost, it is necessary to generate extremely large amounts of incident light initially which, in turn, requires a relatively larger and more powerful light source than would be required were a larger percentage of the incident light to be used. The result is a light source which is expensive, short lived and difficult to control.

SUMMARY OF THE INVENTION

In accordance with the present invention, the above noted problems of the prior art are minimized and there is provided an illuminator which provides a cost saving relative to the prior art. In addition, there is provided improved control over the illumination level, elimination of unreliable moving parts, no requirement for cooling, high efficiency in the use of all generated light, light weight, small size, fast response time and longer mean time between failures.

Briefly, the above is accomplished by providing a tube which is preferably circular, but which can also be rectangular or take on other geometric shapes, fabricated from very highly light transmissive material, preferably a highly light transmissive plastic, preferably an acrylic such as Plexiglass or a polycarbonate such as Lexan. For viewing of the lead frame, the incident light comes from around the object and is diffused so that it scatters in all directions and at all angles. The amount of scattering depends upon the surface roughness at the edge of the light conductor from which the light exits the light conductor. The tube houses two distinct controllable sets of miniature light sources to provide axial and off-axis illumination. These miniature sources are preferably incandescent or LED devices or a combination thereof. The off-axis light passes through the walls of the tube and exits at the preferably diffused bottom end of the illuminator to provide a uniform illumination in the shape of the tube whereas the axial light enters an inner opening or axial bore of the tube and is reflected and scattered along the walls of the bore through hole and illuminates the object in the same manner as a conventional axial light. The inner through hole of the tube can be fabricated with a tapered angle which is not too large to impede the light path from the light sources with the large portion of the taper located in the direction toward the object being illuminated so that the incident light is always reflected downwardly toward the object to be illuminated. The inner surface of the bore can be coated with an appropriate reflecting/scattering material to insure full usage of light and to isolate from each other the axial and off-axis lights beams. Also, the surface of the bore and/or the regions of the illuminator containing the light sources can be roughened to cause diffusion of light striking and/or passing through the roughened surfaces.

In operation, light from the illuminator is provided with controlled intensity from one or both of the two sets of miniature light sources to the object to be illuminated. Light from the object being illuminated is then reflected back and travels back through the bore of the illuminator to the mirror and then, as in the prior art, along the optical axis to the camera via the prism. The light which reaches the camera is then operated upon in standard manner, such as by digital manipulation, digital storage, display and the like.

It can be seen that substantially all of the light from the light sources is utilized and that only a single element is required to provide the lighting function. Furthermore, the beam splitter of the prior art is replaced by a simple mirror, thereby providing the efficiencies as described above from elimination of the beam splitter.

BRIEF DESCRIPTION OF THE DRAWINGS

FIG. 1 is a diagram showing the operation of a beam splitter;

FIG. 2 is a schematic diagram of an illumination system in accordance with the present invention;

FIG. 3a is a cross sectional view of a preferred embodiment of the illuminator in accordance with the present invention; and FIG. 3b is a top view of the preferred embodiment of the illuminator in accordance with the present invention.

DESCRIPTION OF THE PREFERRED EMBODIMENT

Referring first to FIG. 2, there is shown a layout of an optics assembly with camera according to the prior art using the illuminator and mirror in accordance with the present invention. There is shown a camera 1 which receives a picture of the object or device 11 being fabricated and to be illuminated along an optical path 3 within an optical tube 5. The optical tube 5 includes therein a mirror 7 for reflecting light from the object or device 11 being fabricated to the camera via a prism 9. An illuminator 13 provides both the off axis light and the axial light.

As shown in FIGS. 3a and 3b, the illuminator 13 is a highly light transmissive, preferably cylindrical member 14 having a central bore 15 extending therethrough. An axial light source 21 in the form of miniature lamps is disposed around the periphery of the member 14 remote from the object being illuminated 11 and is screened from the remainder of the member 14 by a light shield 23 whereby light from the light source 21 travels along the bore 15. Off axis light is provided from a ring light source 25 which comprises a plurality of miniature lamps disposed around the member 14 and within the light shield 23. The bottom surface 27 and/or the surface of the bore 15 of the illuminator 13 can optionally be polished or roughened to provide a surface roughness of from about 64 to about 2 and preferably 8 (classification for smoothness of a surface in microinches with the larger number representing a rougher surface and surface roughness affecting the amount of light diffusion) to diffuse the light exiting from or striking those surfaces. In addition, the surfaces of the escalloped regions of the illuminator 13 in which the light sources 21 and 25 are disposed can be roughened to cause further diffusion of the light emanating from the light sources. The light sources 21 and 25 are controlled by an external computer or the like. Off axis light is also referred to herein as "ring light".

Both the central bore 15 and/or the outer surface of the illuminator 13 can optionally be coated with a layer of a highly light reflecting material 17, 19, preferably aluminum. The reflective coating 17 within the bore separates the axial light in the illuminator material from the ring light as well as providing a low loss path for the axial light. The reflective coating 19 on the outer surface of the illuminator 13 retains the ring light within the illuminator to minimize loss.

In operation, light from one or both of the light sources 21 and 25 illuminates the object 11. The light from the light source 21 is directed to the bore 15 and travels down the bore, being reflected off of the walls of the bore and the aluminum coating 17. The taper of the bore 15 causes all of the axial light to travel toward the object 11. The ring light from the light source 25 travels through the illuminator body to an exits via the diffused bottom surface 27 to the object 11. Both the axial light and the ring light (or only one of these is only one is being used), are reflected from the object through the bore 15 to the mirror 7. This light is then reflected by the mirror 7 along the optical axis 3 to the prism 9 from which it travels to the camera 1.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. An illumination system for wire bonding at wire bonding locations which comprises:
   (a) an illuminator having a highly light transmissive portion having an end surface and an axial bore extending therethrough and terminating at said end surface, said illuminator including:
      (i) first light source for directing light substantially axially through said bore to said end surface; and
      (ii) a second light source for directing light substantially axially through said highly light transmissive portion to said end surface.

2. The system of claim 1 wherein said end surface is a light diffusing surface.

3. The system of claim 1 wherein said bore is tapered, said taper widening in a direction toward said end surface.

4. The system of claim 2 wherein said bore is tapered, said taper widening in a direction toward said end surface.

5. The system of claim 1 wherein the surface of said bore is a light diffusing surface.

6. The system of claim 2 wherein the surface of said bore is a light diffusing surface.

7. The system of claim 3 wherein the surface of said bore is a light diffusing surface.

8. The system of claim 4 wherein the surface of said bore is a light diffusing surface.

9. The system of claim 1 wherein said bore includes a layer of highly light reflecting material disposed on the surface thereof.

10. The system of claim 2 wherein said bore includes a layer of highly light reflecting material disposed on the surface thereof.

11. The system of claim 3 wherein said bore includes a layer of highly light reflecting material disposed on the surface thereof.

12. The system of claim 4 wherein said bore includes a layer of highly light reflecting material disposed on the surface thereof.

13. The system of claim 1 wherein said highly light transmissive portion includes an outer surface with a layer of highly light reflecting material disposed on said outer surface.

14. The system of claim 2 wherein said highly light transmissive portion includes an outer surface with a layer of highly light reflecting material disposed on said outer surface.

15. The system of claim 4 wherein said highly light transmissive portion includes an outer surface with a layer of highly light reflecting material disposed on said outer surface.

16. The system of claim 9 wherein said highly light transmissive portion includes an outer surface with a layer of highly light reflecting material disposed on said outer surface.

17. The system of claim 10 wherein said highly light transmissive portion includes an outer surface with a layer of highly light reflecting material disposed on said outer surface.

18. The system of claim 12 wherein said highly light transmissive portion includes an outer surface with a layer of highly light reflecting material disposed on said outer surface.

19. The system of claim 1 further including a mirror spaced from said bore in a direction opposed to said end surface and coaxial with said bore for reflecting light passing through said bore and means to digitally store said reflected light.

20. The system of claim 18 further including a mirror spaced from said bore in a direction opposed to said end surface and coaxial with said bore for reflecting light passing through said bore and means to digitally store a representation of said reflected light.

* * * * *